Dec. 6, 1927.　　　　　　　　　　　　　　　　　1,651,485
O. THESEN
DRINKING GLASS
Original Filed Aug. 26, 1924
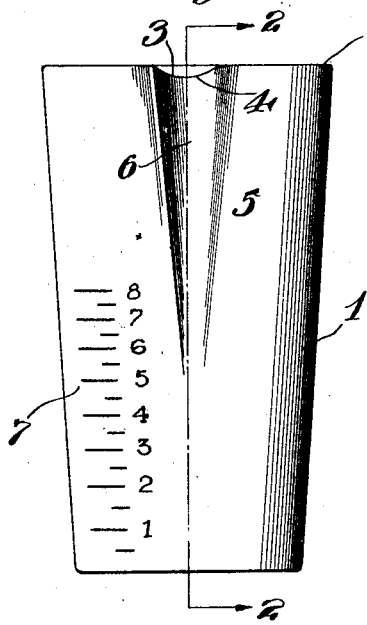
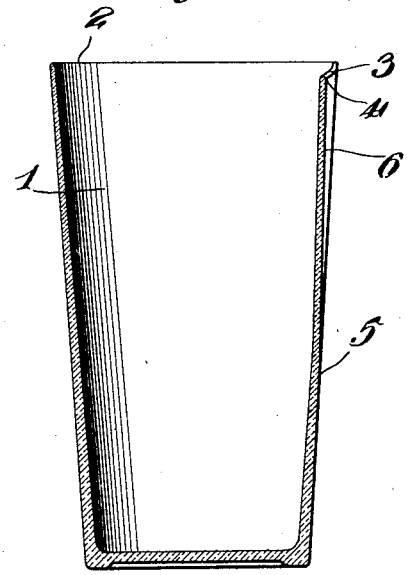
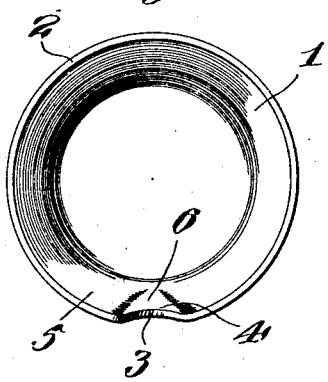
Inventor
Oluf Thesen
By Joshua R. H. Potts
his Attorney
Witnesses:
Virgil L. Mares
George A. Gruss Patented Dec. 6, 1927.

1,651,485

UNITED STATES PATENT OFFICE.

OLUF THESEN, OF PHILADELPHIA, PENNSYLVANIA.

DRINKING GLASS.

Application filed August 26, 1924, Serial No. 734,181. Renewed June 21, 1927.

My invention relates to drinking glasses especially designed for use by a person confined to the bed.

The usual glass, when used by a person lying in bed, does not properly fit the mouth and the liquid runs over the brim and over the face of the user.

The object of my invention is to provide a glass which when used by a person lying in bed will properly fit the mouth and will not allow the liquid to be spilled.

This object, and other advantageous ends which will be described hereinafter, I attain in the following manner, reference being had to the accompanying drawing in which Figure 1 is an elevation of a drinking glass constructed in accordance with my invention, Figure 2 a section on line 2—2 of Figure 1, and Figure 3 a plan view of the glass shown in Figure 1.

Referring to the drawing, 1 indicates a drinking glass having its brim 2 depressed at 3 to fit in the mouth of the user against the outer side of the lower row of teeth. The edge 4 of the depressed part is curved inwardly from the brim so that when the glass is tilted for drinking, the liquid will run, practically simultaneously, over the entire edge 4. This causes the liquid level to be of such width that the upper lip of the user may be conveniently immersed for proper drinking.

The side 5 of the glass is pressed inward at 6 directly beneath the edge 4 of the depressed part so that the lower lip of the user will comfortably fit under edge 4 and prevent the liquid from spilling.

The glass is preferably graduated at 7 to indicate the number of ounces of liquid at various levels.

With the glass above set forth, a person lying in bed may drink the liquid in the glass without allowing it to spill and without raising the head to an uncomfortable position.

While I have described my invention as taking a particular form, it will be understood that the various parts may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. A drinking glass having its brim depressed and curved inwardly to fit in the mouth against the outer side of the teeth and the side of the glass beneath the depressed part pressed inward.

2. A drinking glass having a part of its brim slightly depressed and curved to fit against the outer side of the teeth, the body of glass below said depression being inwardly curved.

In testimony whereof I have signed my name to this specification.

OLUF THESEN.